United States Patent
Huseth et al.

(10) Patent No.: US 10,512,801 B2
(45) Date of Patent: Dec. 24, 2019

(54) DISTANCE-LEARNING SAFETY RETRACTION LANYARD

(71) Applicant: Honeywell International Inc., Morris Plains, NJ (US)

(72) Inventors: Steve Huseth, Plymouth, MN (US); Christopher Scott Larsen, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 62 days.

(21) Appl. No.: 15/959,078

(22) Filed: Apr. 20, 2018

(65) Prior Publication Data
US 2019/0321665 A1 Oct. 24, 2019

(51) Int. Cl.
*A62B 35/00* (2006.01)
*G05B 9/02* (2006.01)
*G05B 13/02* (2006.01)

(52) U.S. Cl.
CPC ...... *A62B 35/0093* (2013.01); *A62B 35/0075* (2013.01); *G05B 9/02* (2013.01); *G05B 13/0265* (2013.01)

(58) Field of Classification Search
None
See application file for complete search history.

(56) References Cited

U.S. PATENT DOCUMENTS

| | | | |
|---|---|---|---|
| 4,081,152 A | * | 3/1978 | Henderson ............ B60R 22/44 242/371 |
| 4,106,721 A | * | 8/1978 | Ulrich .................... B60R 22/44 242/371 |
| 4,475,163 A | | 10/1984 | Chandler et al. |
| 8,701,833 B2 | | 4/2014 | Marquardt et al. |

(Continued)

FOREIGN PATENT DOCUMENTS

WO 2016176301 A2 11/2016

OTHER PUBLICATIONS

Self-Retracting Lifeline offers dual-mode operation. Capital Safety, Thomas Industry Update. Press Release Summary [online]. Jun. 23, 2009 [Retrieved Nov. 21, 2017]. Retrieved from the Internet: <URL: https://news.thomasnet.com/fullstory/self-retracting-lifeline-offers-dual-mode-operation-561878>.

*Primary Examiner* — Bernard G Lindsay
(74) *Attorney, Agent, or Firm* — Craige Thompson; Thompson Patent Law; Vincent Musgrove

(57) ABSTRACT

Apparatus and associated methods relate to a distance-learning safety retraction device (DLSRD) mechanically coupled to a fixed anchor point on a boundary-mapped surface, the DLSRD including two receivers in operable communication with a transmitter borne on a user. In an illustrative example, the DLSRD may determine an angle between a lanyard coupled to the user and a vertical plane between the two receivers. The DLSRD may include, for example, an extraction detector detecting an extracted length of the lanyard. The DLSRD may determine user proximity (Continued)

to a safe operating area boundary based upon a difference of a current extracted length of the lanyard to a learned extracted length associated with a current angle of the lanyard, for example. Various DLSRDs may be configured in a run-mode to apply a braking effect to the lanyard and/or to activate a warning device based upon the user's proximity to the boundary.

18 Claims, 10 Drawing Sheets

(56) References Cited

U.S. PATENT DOCUMENTS

| | | | |
|---|---|---|---|
| 10,274,913 B2* | 4/2019 | Fife | G05B 15/02 |
| 2006/0125693 A1* | 6/2006 | Recker | G01S 5/14 |
| | | | 342/458 |
| 2009/0260922 A1* | 10/2009 | Marquardt | A62B 1/10 |
| | | | 182/232 |
| 2010/0026569 A1* | 2/2010 | Amidi | G01S 19/48 |
| | | | 342/357.48 |
| 2013/0031046 A1* | 1/2013 | Huseth | G01S 3/74 |
| | | | 706/52 |
| 2016/0047887 A1* | 2/2016 | Niewczas | G01S 5/14 |
| | | | 342/458 |
| 2017/0371025 A1 | 12/2017 | Rollero | |
| 2017/0374436 A1* | 12/2017 | Awiszus | A62B 9/00 |
| 2018/0107169 A1* | 4/2018 | Hu | A62B 35/0043 |
| 2018/0126198 A1* | 5/2018 | Troy | G08B 21/0446 |

* cited by examiner

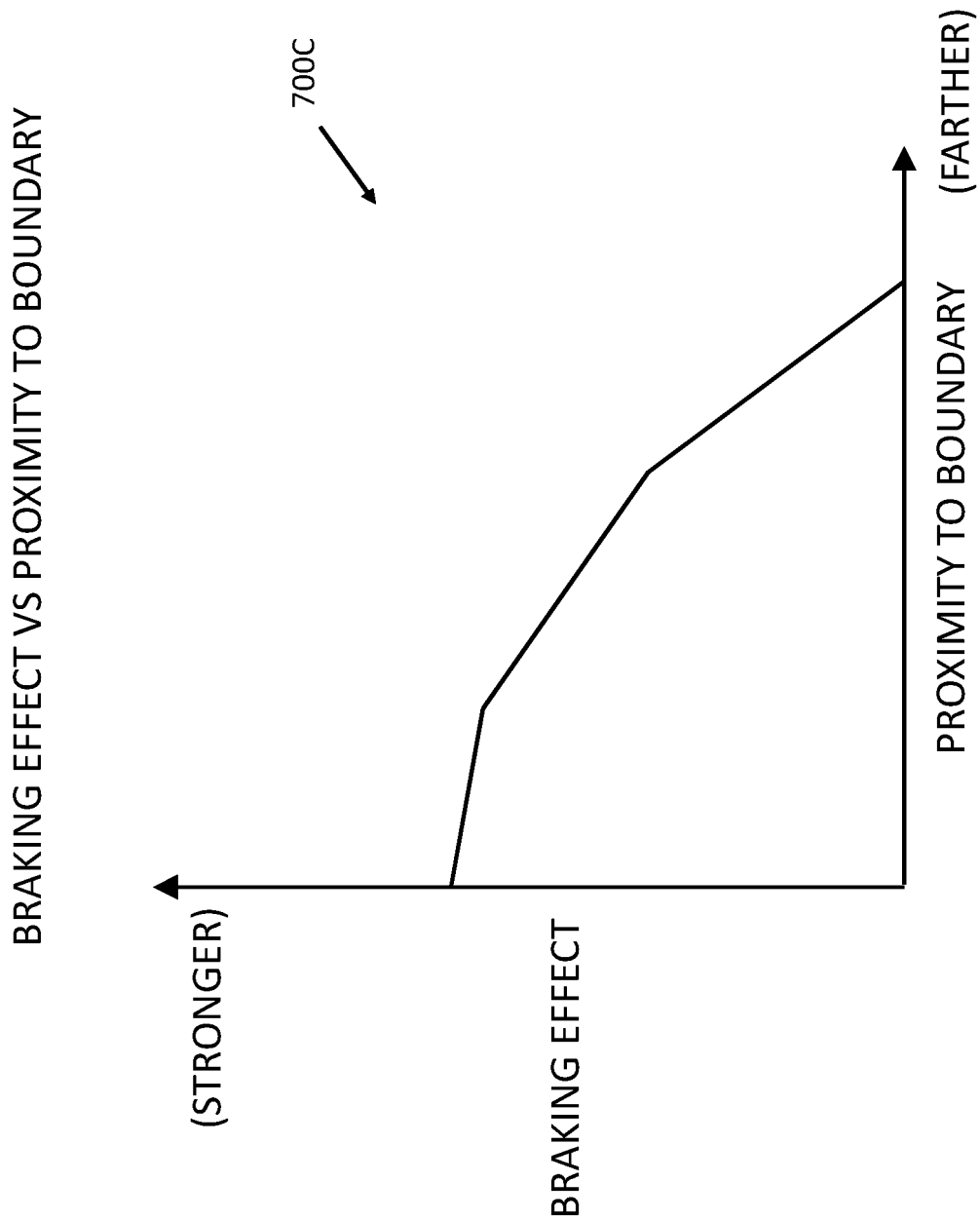

DISTANCE-LEARNING SAFETY RETRACTION LANYARD

TECHNICAL FIELD

Various embodiments relate generally to personal protection equipment.

BACKGROUND

Worldwide, individuals make a living performing in a myriad of jobs. Many jobs include various hazards from minor cuts and abrasions to more serious hazards such as loss of life. In some examples, highway construction workers may be exposed to adjacent flows of automobile traffic. Welders may be exposed to intense light that may cause eye damage. Construction workers may be exposed to falling objects. In some examples, trash and recycling collectors may be exposed to abrasive, sharp or corrosive waste.

Personal protection equipment (PPEs) may be worn by workers in hazardous environments. PPEs may protect workers from the harmful effects of various hazards. For example, highway construction workers may wear brightly colored vests to become highly visible to motorists. Welders may strap on a face-shield with protective light filtering lenses to filter out the effects of damaging light from welding arcs. In the construction industry, workers may wear various headgear, such as hardhats, to protect against falling objects. In some instances, the lanyards may be implemented in various types of self-retracting devices (SRDs).

SUMMARY

Apparatus and associated methods relate to a distance-learning safety retraction system (DLSRS) mechanically coupled to a fixed anchor point on a boundary-mapped surface, the DLSRS including two receivers in operable communication with a transmitter borne on a user. In an illustrative example, the DLSRS may determine an angle between a lanyard coupled to the user and a vertical plane between the two receivers. The DLSRS may include, for example, an extraction detector detecting an extracted length of the lanyard. The DLSRS may be configured in a learn-mode to store a set of associations of extracted lengths and angles as the user walks a boundary of the boundary-mapped surface, for example.

Apparatus and associated methods relate to a distance-learning safety retraction system (DLSRS) mechanically coupled to a fixed anchor point on a boundary-mapped surface, the DLSRS including two receivers in operable communication with a transmitter borne on a user. In an illustrative example, the DLSRS may determine an angle between a lanyard coupled to the user and a vertical plane between the two receivers. The DLSRS may include, for example, an extraction detector detecting an extracted length of the lanyard. The DLSRS may determine user proximity to a safe operating area boundary based upon a difference of a current extracted length of the lanyard to a learned extracted length associated with a current angle of the lanyard, for example. Various DLSRS may be configured in a run-mode to apply a braking effect to the lanyard and/or to activate a warning device based upon the user's proximity to the boundary.

Various embodiments may achieve one or more advantages. For example, some DLSRSs may detect a prefall condition based on a learned perimeter of a safe operating area and may provide resistance to further lanyard extraction. Some DLSRSs may provide various haptic feedback to a lanyard in advance of a braking effect to warn a user of proximity to potentially hazardous zones. Some DLSRSs may be combined with a guy wire and lateral sensors to broaden an area of a protected worksite. Some DLSRSs may be transported from worksite to worksite and may be reconfigured to learn new protected areas.

The details of various embodiments are set forth in the accompanying drawings and the description below. Other features and advantages will be apparent from the description and drawings, and from the claims.

BRIEF DESCRIPTION OF THE DRAWINGS

FIG. 7C depicts a graph view of an exemplary braking effect as a piecewise linear function of a user's proximity to a boundary of a boundary-mapped surface.

Like reference symbols in the various drawings indicate like elements.

DETAILED DESCRIPTION OF ILLUSTRATIVE EMBODIMENTS

To aid understanding, this document is organized as follows. First, an exemplary distance learning safety retraction system (DLSRS) at a stationary anchor point and a laterally translating anchor point are briefly introduced with reference to FIGS. 1-4. Second, with reference to FIG. 5, the discussion turns to a block diagram of an exemplary DLSRS illustrating electrical and mechanical coupling relationships. Next, with reference to FIG. 6, a flowchart illustrating a method of control of an exemplary DLSRS is discussed. Finally, with reference to FIGS. 7A, 7B, 7C and 7D, various exemplary braking effect functions are presented.

Figure 1:
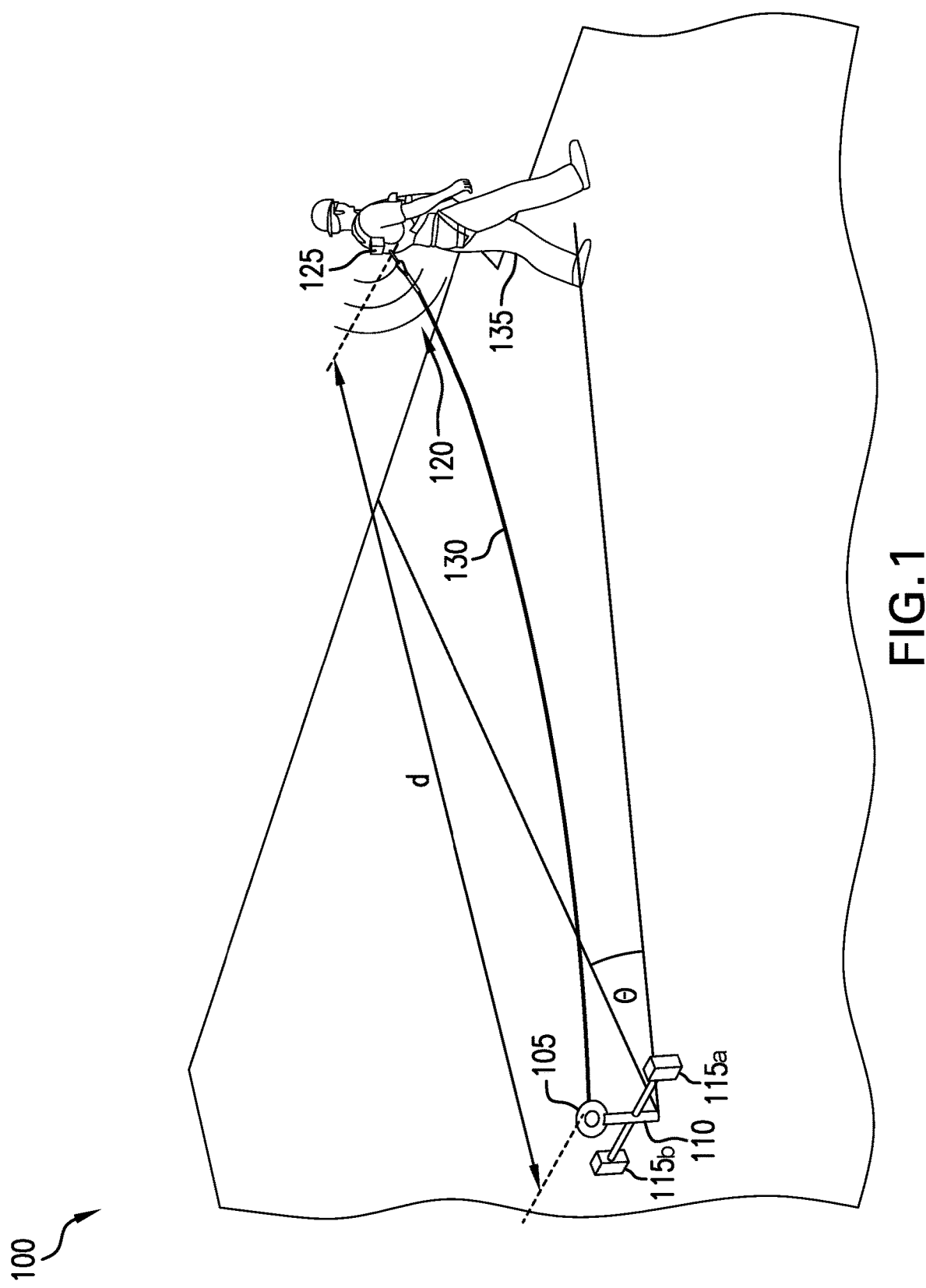
FIG. 1 depicts a perspective view of an exemplary distance learning safety retraction system (DLSRS) attached to a worker walking along an edge of a roof, the DLSRS learning the distance to the roof edge during a learn-mode and resisting additional lanyard extraction during a run-mode.

FIG. 1 depicts a perspective view of an exemplary distance learning safety retraction system (DLSRS) attached to a worker walking along an edge of a roof, the system learning the distance to the roof edge during a learn-mode and resisting additional lanyard extraction during a run-mode. In the depicted example, a distance learning safety retraction system (DLSRS) 100 includes a distance learning safety retraction device (DLSRD) 105. The DLSRD 105 is mechanically coupled to a roof anchor 110. The DLSRS 100 includes a pair of receivers 115A and 115B proximate to the roof anchor 110. In some embodiments, the pair of receivers 115A and 115B may be mechanically coupled to the roof anchor 110. The pair of receivers 115A and 115B are spatially separated and receive a wireless signal 120. The wireless signal 120 is generated by a transmitter 125. The DLSRS 100 includes the transmitter 125. A proximal end of a safety lanyard 130 is coupled to the DLSRD 105. A roof worker 135 is coupled to the distal end of the safety lanyard 130. The transmitter 125 is proximate to a roof worker 135. In this exemplary configuration, the transmitter 125 transmits a wireless signal 120 from a location of the roof worker 135. The safety lanyard 130 may be coupled to and wound on a take-up spool, which may be rotatably coupled to the DLSRD 105. In some implementations, the DLSRD 105 may determine an angle θ between the safety lanyard 130 and a vertical plane equidistant from the pair of receivers 115A and 115B. The DLSRD 105 may engage a brake to resist additional extraction of the safety lanyard 130 based on a learned perimeter of a safe operation area. The DLSRD 105 may receive information representative of one or more stored extracted lengths associated with angles previously determined by positioning the transmitter at a plurality of locations along the boundary of the surface. The DLSRD 105 may generate a braking signal as a function of a proximity of a user to a safe operating area boundary.

In various implementations, the transmitter 125 may be an ultrasound generator and the receivers 115A and 115B may be ultrasound microphones, for example. In various implementations, the transmitter 125 may be an electromagnetic (EM) generator and the receivers 115A and 115B may include EM antennas electrically coupled to EM detection circuitry. An EM wireless system, such as a radio frequency (RF) transmitter and RF receiver may advantageously provide accurate results in windy and/or rainy environmental conditions, for example. In various implementations, the transmitter 125 may be an optical generator and the receivers 115A and 115B may include optical sensors electrically coupled to detection circuitry. An optical wireless system, such as a laser transmitter and a laser receiver may advantageously provide accurate results in EM polluted environments, for example.

In some implementations, if the roof worker 135 falls from the roof, then the rapid increase in the safety line being pulled out of the DLSRD 105 may be detected and a braking mechanism may be engaged. Various examples of DLSRDs may allow calibration (e.g., learning, training) corresponding to a boundary-mapping of various work platforms. The DLSRDs may determine a position of a worker, such as roof worker 135, by measuring the length of cable extended from the DLSRD and by determining the angle made by the worker with respect to a fixed axis extending through the anchor point, such as roof anchor 110. The DLSRD 105 may include a brake, which may be increasingly applied to advantageously increase the drag on the safety lanyard 130 as the roof worker 135 approaches the edge of a work platform, such as the roof edge.

Figure 2:
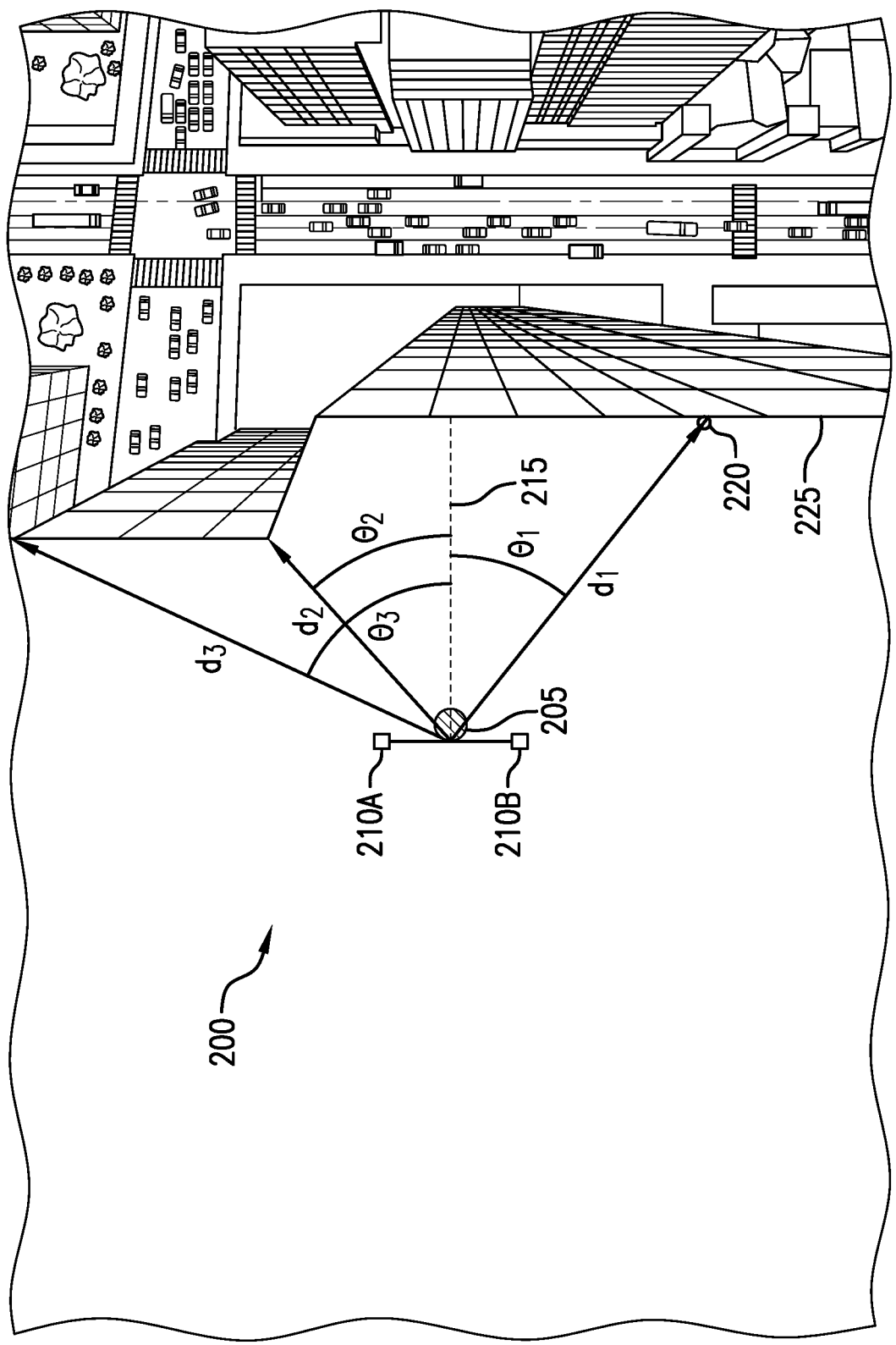
FIG. 2 depicts a plan view of three exemplary distances from an anchor point, each distance associated with a unique angle with respect to a horizontal axis equidistant from a pair of receivers.

FIG. 2 depicts a plan view of three exemplary distances from an anchor point, each distance associated with a unique angle with respect to a horizontal axis equidistant from a pair of receivers. A rooftop 200 includes a fall protection anchor point 205. The anchor point 205 is fixedly coupled to the rooftop 200. A pair of receivers 210A and 210B are in a fixed spatial relationship relative to the anchor point 205. A horizontal axis 215 is equidistant between the pair of receivers 210A and 210B and runs through the anchor point 205. The pair of receivers 210A and 210B are operable to receive a wireless signal from a transmitter 220. In various implementations, the pair of receivers 210A and 210B may produce a pair of baseband signals in response to receiving the wireless signals. The pair of baseband signals when processed for their temporal content may be indicative of an angle $\theta_1$. The angle $\theta_1$ is formed between a first ray originating at the anchor point 205 and following the horizontal axis 215 and a second ray originating at the anchor point 205 and directed at the transmitter 220.

A user bearing the transmitter 220 may be tethered to a distance learning safety retraction system (DLSRS). The DLSRS may include a distance learning safety retraction device (DLSRD), mechanically coupled to the anchor point 205. The user may be located at a distance $d_1$ from the anchor point 205. The DLSRD may include a controller. The controller may be operable to receive the pair of baseband signals from the pair of receivers 210A and 210B to determine an angle θ. An extraction length of lanyard may be extracted from the DLSRD. The controller may be operable to receive an extraction length signal indicative of the extraction length from an extraction length sensor to determine a distance d. For example, at an angle $\theta_1$ the controller may determine a distance $d_1$. At an angle $\theta_2$ the controller may determine a distance $d_2$. Finally, at an angle $\theta_3$ the controller may determine a distance $d_3$. In various exemplary implementations, the controller may receive location distances, such as $d_1$, $d_2$ and $d_3$ from various location detectors.

In a learn-mode, as the user walks along a rooftop edge 225, the controller may determine an angle θ and a distance d. The angle may be determined, for example, by an angle of arrival method, using a radio frequency (RF) transmitter and RF receivers. The controller may store the distance d and the angle θ in a memory array. The stored array may represent a learned boundary. Accordingly, the controller may advantageously learn an arbitrary boundary in the learn-mode.

In some examples, a DLSRS may advantageously relearn a boundary, for example, when the DLSRS is relocated. In some embodiments, the DLSRS may mandate a learn-mode each time the DLSRS detects a relocation. For example, the DLSRS may detect a relocation whenever power is turned off to the controller. In some implementations, the DLSRS may include an electronic switch in an anchor attachment mechanism, such that when the attachment mechanism is opened, the DLSRS may detect a relocation. When the DLSRS detects a relocation, the DLSRS may apply the brake to alert the user that the protected boundary needs to be relearned, and to prevent accidental use. The brake may be applied until the user depresses a learn button, for example. In some implementations, when the DLSRS detects a relocation, the DLSRS may produce an audible, visual and/or haptic warning, to alert the user that the protected boundary needs to be relearned.

In an illustrative example, where the transmitter 220 may be an ultrasound generator and the pair of receivers 210A and 210B may be ultrasound microphones, for example, the time difference δt (delta t) of an ultrasound signal arriving at two microphones may be described as:

$$c\delta t = L \sin \theta$$

where c is the sound velocity and L is the distance between the two ultrasound microphones (baseline of triangulation). Accordingly, the processor may determine the angle of arrival θ using the following formula:

$$\theta = \sin^{-1}(c\delta t / L)$$

In the depicted configuration, as the distal end of a safety lanyard traces the rooftop edge 225, the angle of arrival θ varies. Further, as the distal end of the safety lanyard traces the rooftop edge 225, a distance d varies. Accordingly, an edge distance $d_E$ of the roof edge 225 may be a function of the angle of arrival θ:

$$d_E = f(\theta)$$

In the learn-mode, the distal end of the safety lanyard may trace the rooftop edge 225. The processor may record the edge distance $d_E$, for example, $d_2$, for multiple angles of arrival θ, for example, $\theta_2$. This association of edge distance $d_E$ for multiple angles of arrival θ may characterize the shape and/or boundary of the roof edge.

In a run-mode, with the roof edge characterization in place from the learn-mode, the user may arbitrarily walk the confines of the roof while the processor continuously checks the angle of arrival θ and a current distance d, received from, for example, the extraction length sensor.

In various examples, a DLSRS may include a brake. The brake may be controlled by the controller. If the controller determines that the difference between the edge distance and a current distance is less than a predetermined margin, then the controller may apply the brake. The intensity of the brake may be a predetermined function of the difference between the edge distance and a current distance. In various examples, the difference between the edge distance and a current distance may be the proximity.

Figure 3:
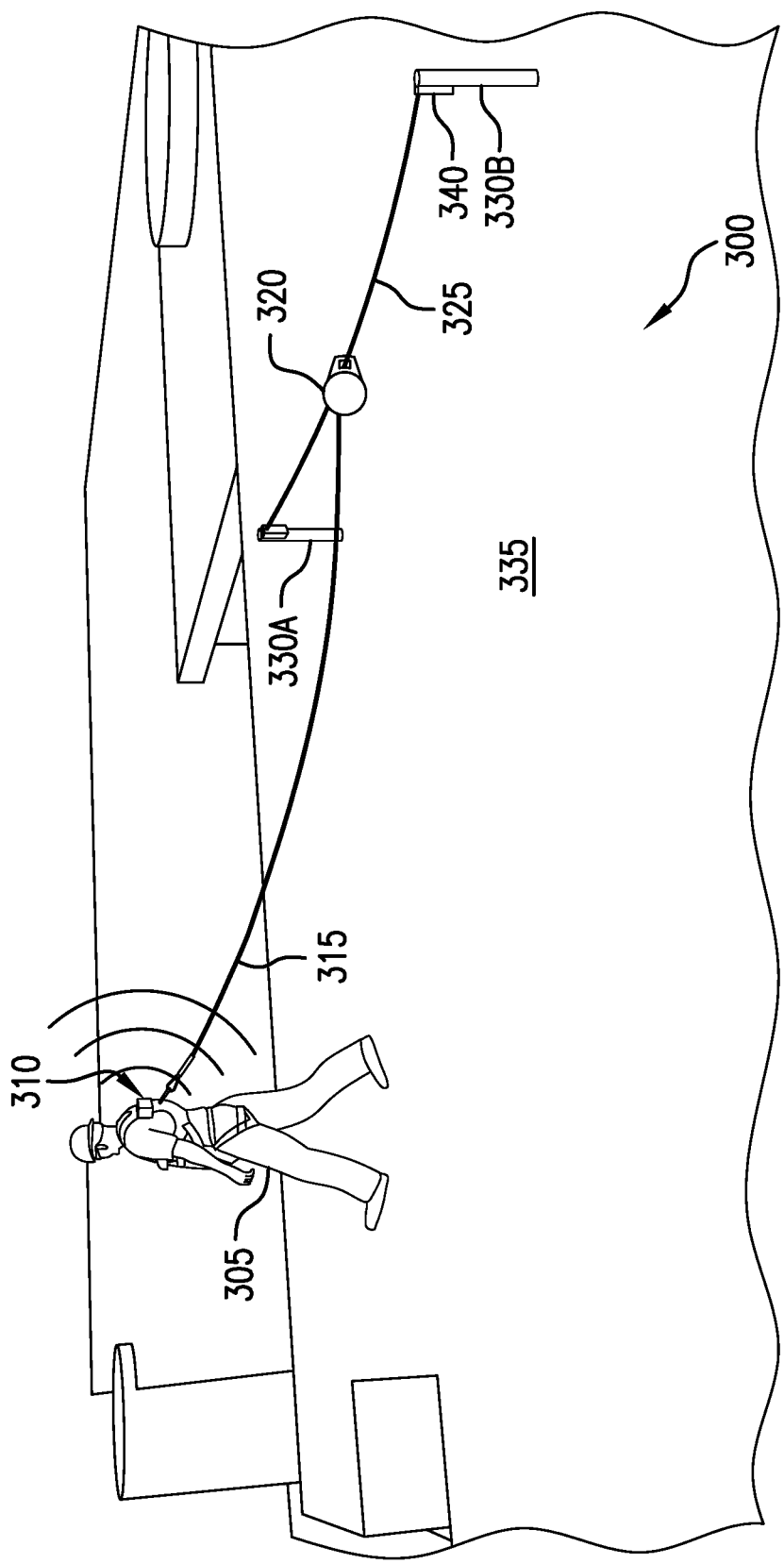
FIG. 3 depicts a perspective view of an exemplary distance learning safety retraction device (DLSRD) attached to a worker walking toward the edge of a roof, the DLSRD translating along a guy wire to extend a lateral range.

FIG. 3 depicts a perspective view of an exemplary distance learning safety retraction device (DLSRD) attached to a worker walking toward the edge of a roof, the DLSRD translating along a guy wire to extend a lateral range. A rooftop worksite 300 includes a roof maintenance worker 305. A transmitter 310 is coupled to the back of the roof maintenance worker 305. The roof maintenance worker 305 is tetherably coupled to a lanyard 315 at a distal end. The lanyard 315 is coupled to a DLSRD 320 on a proximal end. The DLSRD 320 is mechanically coupled to a guy wire 325 in a translatable relationship, for example. The guy wire 325 is fixedly coupled to a pair of anchor posts 330A and 330B. The anchor posts 330A and 330B are fixedly coupled to a rooftop 335. Each of the anchor posts 330A and 330B are respectively coupled, for example, at a top end to one or more lateral beacons 340. In some examples, one anchor post may be coupled to one beacon. In some examples, each post may be coupled to one beacon.

The DLSRD 320 is operable to sense its position along the guy wire 325 by detecting its distance from the lateral beacon 340. In some examples, the lateral beacon 340 may be an optical beam received by the DLSRD 320. In some examples, the optical beam may be sourced by the DLSRD 320 and may be aimed at the lateral beacon 340, which may be a retroreflector. In some examples, the lateral beacon 340 may transmit a wireless signal such as an ultrasonic wave or a radio frequency electromagnetic wave. Accordingly, the DLSRD 320 may be configured to receive the signal(s) and to determine its distance from the lateral beacon 340. The DLSRD 320 may receive information representative of one or more stored extracted lengths associated with angles previously determined by positioning the transmitter at a plurality of locations along the boundary of the surface. The DLSRD 320 may generate a braking signal as a function of a proximity of a user to a safe operating area boundary.

In various examples, when the DLSRD 320 may be in an intermediate position between the anchor posts 330A and 330B, a controller included in the DLSRD 320 may assume the angle of the lanyard 315 with respect to the guy wire 325 is 90 degrees. When the DLSRD 320 is at a limit of the guy wire 325 (e.g., at one of the anchor posts 330A or 330B), the DLSRD 320 may determine the angle of the lanyard 315. The DLSRD 320 configured to translate along the guy wire 325 may advantageously increase a worker's fall protection area.

Figure 4:
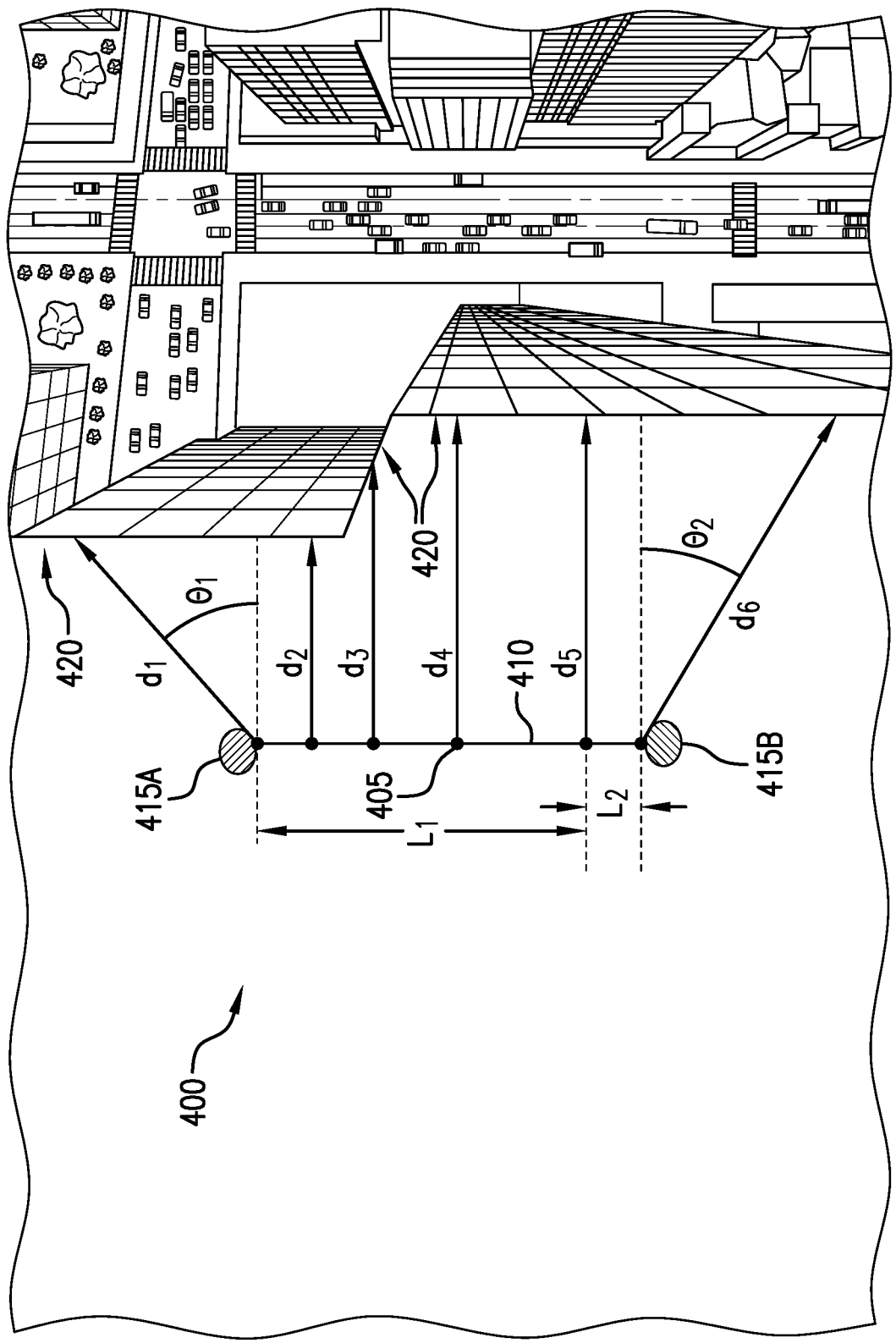
FIG. 4 depicts a plan view of six exemplary distances from a laterally translating anchor point along a guy wire, each distance associated with a unique angle and a unique lateral translation length.

FIG. 4 depicts a plan view of six exemplary distances from a laterally translating anchor point along a guy wire, each distance associated with a specific angle and a specific lateral translation length. An exemplary DLSRS functional depiction 400 includes an exemplary DLSRD location point 405. The exemplary DLSRD location point 405 may depict a lateral location of a DLSRD such as the DLSRD 320 (FIG. 3) translating along a guy wire 410. The guy wire 410 is supported by two lateral anchor posts 415A and 415B. A lateral translation length L1 may be determined by the DLSRS in conjunction with a lateral beacon, for example, the lateral beacon 340 as described with reference to FIG. 3. The DLSRS may determine a distance d (e.g., $d_2$, $d_3$, $d_4$, $d_5$) from various DLSRD location points along the guy wire 410. Accordingly, the DLSRS may learn a rooftop edge 420 by saving the distances d in association with a respective DLSRD location point.

When the DLSRD is at the limit of travel along the guy wire 410, such as at one of the anchor posts 415A or 415B, an angle may be determined as discussed with reference to FIG. 2. Accordingly, the DLSRS may learn the rooftop edge 420 by saving the distances d (e.g., $d_6$) in combination with an associated DLSRD location point L (e.g., L1) along the guy wire 410, and an associated angle θ (e.g., $\theta_2$). The rooftop edge 420 may be a protected perimeter. The DLSRD configured to translate along the guy wire 410 may advantageously increase a user's fall protection perimeter.

Figure 5:
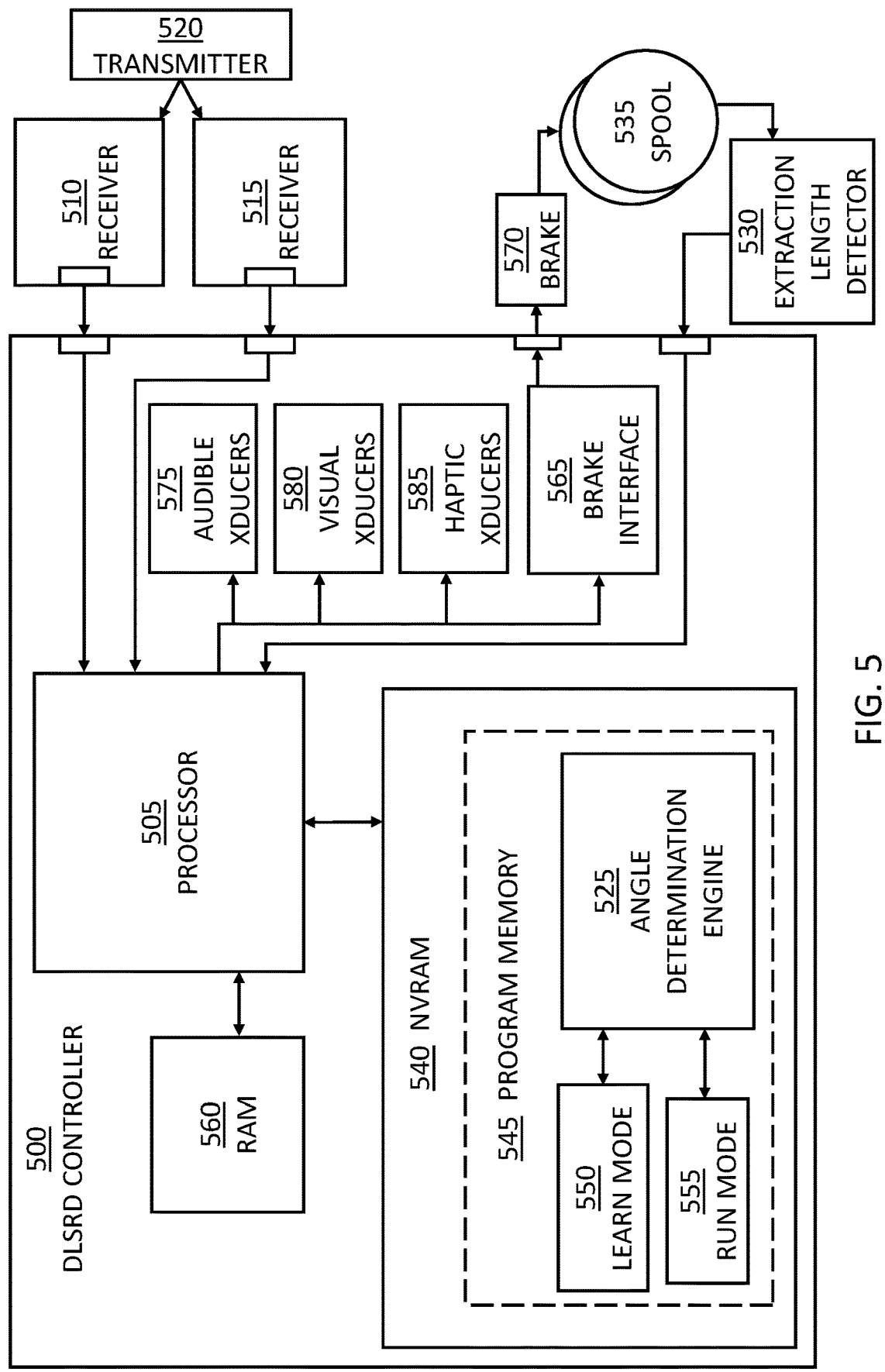
FIG. 5 depicts a block diagram view of an exemplary DLSRS.

FIG. 5 depicts a block diagram view of an exemplary DLSRS. A DLSRS includes a DLSRD. The DLSRD includes a DLSRD controller 500. The DLSRD controller 500 includes a processor 505. The processor 505 is operably coupled to a receiver 510 and a receiver 515. The receivers (510, 515) are operable to receive a signal from a transmitter 520. The processor 505 may execute preprogrammed instructions of an angle determination engine 525 to determine an angle location of the transmitter 520 based on the time between when the receiver 510 receives the signal and when the receiver 515 receives a signal.

The processor 505 is operably coupled to an extraction length detector 530. The extraction length detector 530 is operable to produce an encoded extraction length of an DLSRD spool 535. The processor 505 may determine the extracted length of the DLSRD spool 535 from the encoded extraction length.

The processor 505 is operably coupled to a non-volatile random-access memory (NVRAM) 540. The NVRAM 540 includes a program memory 545. The program memory 545 includes preprogrammed instructions to be executed by the processor 505. The preprogrammed instructions include the angle determination engine 525, a learn-mode 550 and a run-mode 555. An angle location value and associated extracted length value of the DLSRD determined by the processor 505 may be paired and stored in the NVRAM 540 in the learn-mode 550. The processor 505 is coupled to a random-access memory (RAM) 560. The processor 505 may employ the RAM 560 for general execution and computation.

The processor 505 is operably coupled to a brake interface 565. The brake interface 565 is operable to actuate a brake 570. The brake 570 is operable to limit the rotation of the DLSRD spool 535 in the run-mode 555, when the processor 505 determines that a current extraction length associated with a current angle is within a predetermined range of a stored extraction length associated with the current angle.

The processor 505 is operably coupled to an audible transducer 575. In various implementations, the processor 505 may activate the audible transducer 575, for example, when the brake 570 is activated. In some examples, the audible transducer 575 may produce unique tones to indicate entry into the learn-mode 550 and/or the run-mode 555. The processor 505 is operably coupled to a visual transducer 580. In some implementations, the visual transducer 580 may include one or more lights (e.g., LEDs). The processor 505 may actuate the visual transducer(s) 580, for example, to indicate when the DLSRD controller 500 is in the learn-mode 550 and/or the run-mode 555. The processor 505 is operably coupled to a haptic transducer 585. In some implementations, the haptic transducer 585 may include a vibration module. The processor 505 may activate the haptic transducer 585 to transduce vibrations onto a lanyard, for example, to indicate when a user is nearing and/or at a learned boundary. The haptic transducer 585 may produce a haptic feedback. The haptic feedback may become more intense as the user gets nearer to the learned boundary, for example. The haptic feedback feature may advantageously signal warnings to users who may be hearing impaired, or who may be working in an acoustically noisy and/or windy environment, for example. In various implementations, the haptic feedback may include pulse encoded messages. For example, for a group of users working in a common worksite, the foreman may receive a unique haptic pulsed encoded message that may indicate that one of the foreman's team is approaching an unsafe boundary. The DLSRD controller 500 may receive information representative of one or more stored extracted lengths associated with angles previously determined by positioning the transmitter at a plurality of locations along the boundary of the surface. The DLSRD controller 500 may generate a braking signal as a function of a proximity of a user to a safe operating area boundary.

Figure 6:
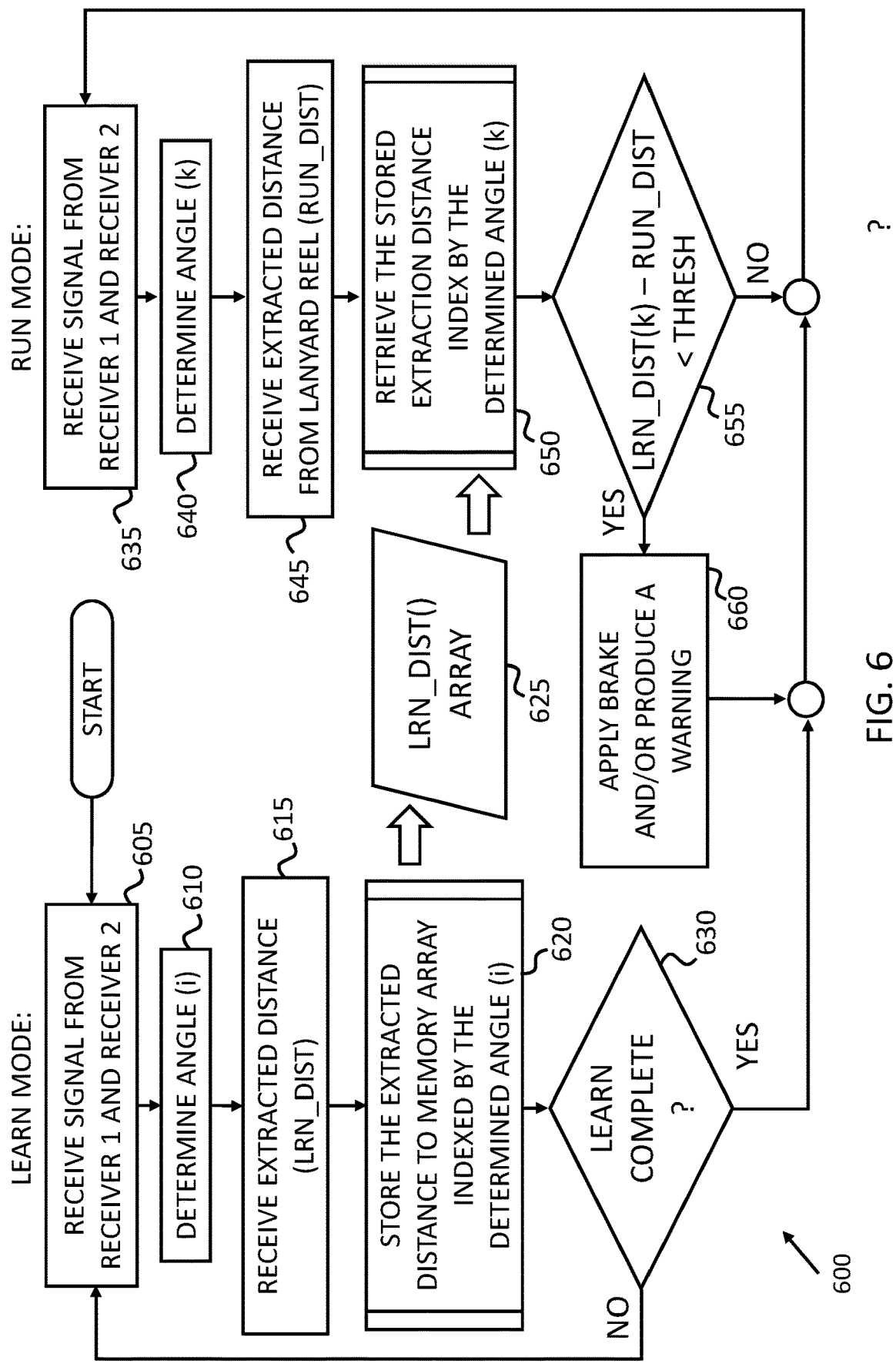
FIG. 6 depicts a flowchart view of an exemplary DLSRD process.

FIG. 6 depicts a flowchart view of an exemplary DLSRD process. A DLSRD process flowchart 600 begins at process step 605. At process step 605, a learn-mode is initiated. In learn-mode, a user may walk an arbitrary edge of a rooftop, for example. The user may be tethered to a distal end of a lanyard and may be wearing a transmitter. The tether may be fixedly coupled at a proximal end to the DLSRD anchored to the rooftop at a fixed distance from the edge of the rooftop. The left-side process depicted in FIG. 6 stores a value of an extracted length of lanyard from a DLSRD into a memory array indexed by a determined angle from a fixed axis in a horizontal plane. In this manner, the DLSRD may learn the spatial position of the arbitrary edge of the rooftop.

At process step 605, the DLSRD receives a time-differentiated signal (originating from the transmitter) from receiver 1 and receiver 2. Next, at process step 610, the DLSRD determines a learn-mode angle as a predetermined function of the received time-differentiated signals. Next, at process step 615, the DLSRD receives a learned extracted length from a distance encoder coupled to a lanyard reel. Next, at process step 620, the DLSRD stores the learned extracted length into a learned-distance memory array 625 indexed by the learned angle. Next, at process step 630, the DLSRD determines a state of completion of the learn-mode. If the learn-mode is not complete, execution is directed back to process step 605. If the learn-mode is complete, then execution is directed to process step 635, which initiates a run-mode. In various examples, the state of completion may be indicated by a user. For example, the user may sharply tug on the lanyard to indicate to the DLSRD that the learning is complete. The DLSRD may acknowledge the tug by sounding an audible signal back to the user, for example. In some examples, the user may select a button on the DLSRD to indicate termination of the learn-mode. In some examples, the DLSRD may determine the end of the learn-mode when, for instance, the DLSRD determines that the user has walked into a location that is closer than the boundary that is currently being learned.

In the run-mode, the user may arbitrarily move between the DLSRD anchored to the rooftop and the edge of the rooftop. As in the learn-mode, the user may be tethered to the distal end of the lanyard and may be wearing the transmitter. The tether may be fixedly coupled at a proximal end to the DLSRD anchored to the rooftop at a fixed distance from the edge of the rooftop. The right-side process depicted in FIG. 6 retrieves a learned extracted length of lanyard from a DLSRD from a memory array indexed by a current run-mode angle from the fixed axis in the horizontal plane. The DLSRD compares the retrieved learned extracted length at the current run-mode angle with a current run-mode extracted length. A braking force intensity may be controlled as a function of the comparison. The DLSRD may control the braking force of a brake in response to the user's nearness to the edge of the rooftop.

At process step 635, the DLSRD receives a time-differentiated signal (originating from the transmitter) from receiver 1 and receiver 2. Next, at process step 640, the DLSRD determines the run-mode angle as a predetermined function of the received time-differentiated signals. Next, at process step 645, the DLSRD receives a run-mode extracted length from the lanyard reel. Next, at process step 650, the DLSRD retrieves the learned extraction distance from the learned-distance memory array 625 indexed by the determined run-mode angle. Next, at process step 655, if the difference between the run-mode extraction length and the retrieved learned-distance for the specific run-mode angle is greater than a predetermined threshold, then execution continues to process step 660, where the DLSRD applies a brake and/or produces a warning. The braking force intensity may be controlled as a function of the determined difference.

Figure 7A:
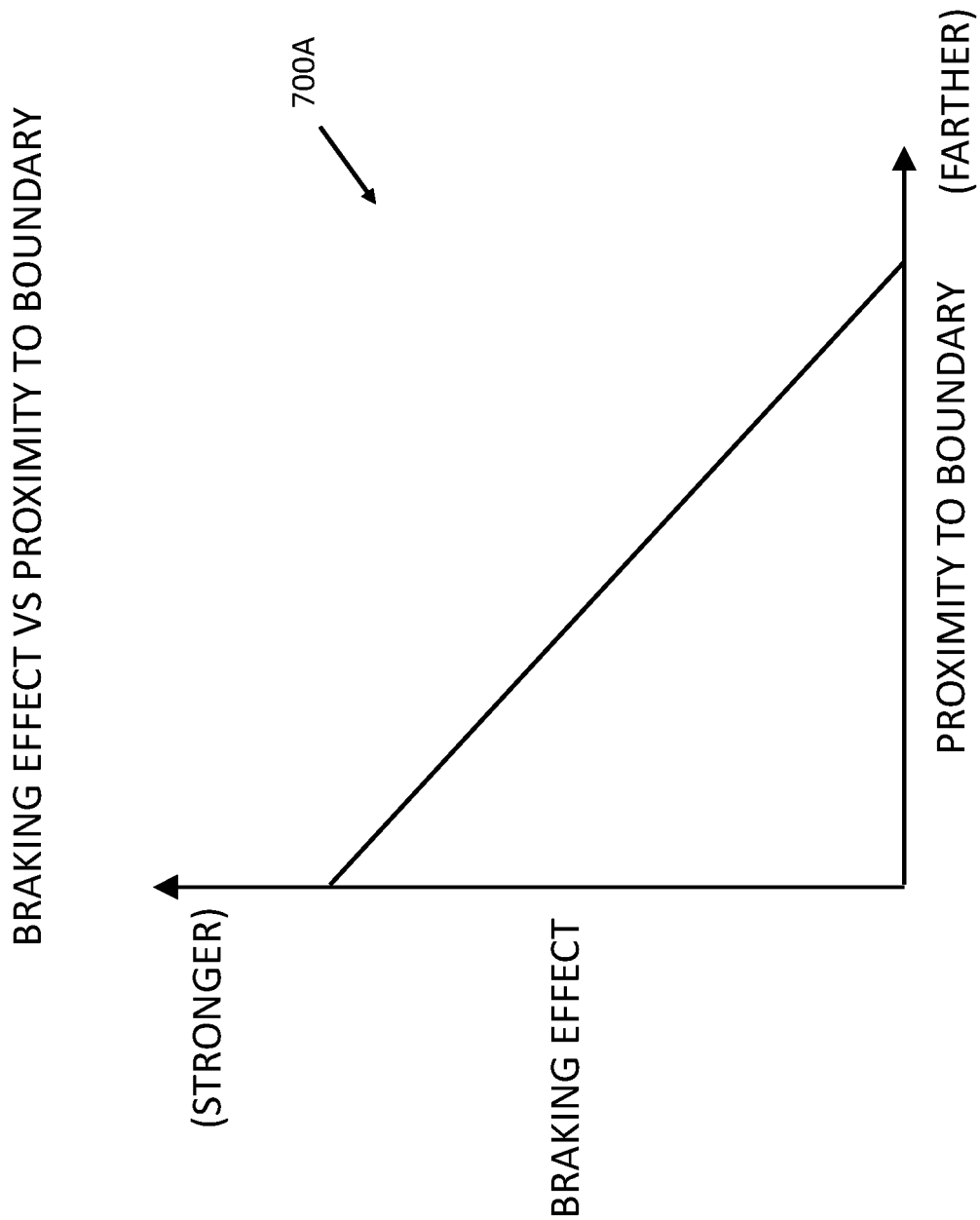
FIG. 7A depicts a graph view of an exemplary braking effect as a linear function 700A of a user's proximity to a boundary of a boundary-mapped surface.

FIG. 7A depicts a graph view of an exemplary braking effect as a linear function 700A of a user's proximity to a boundary of a boundary-mapped surface. The linear function 700A may be used by various controllers to generate a braking signal as a function of a proximity of a user to a safe operating area boundary.

Figure 7B:
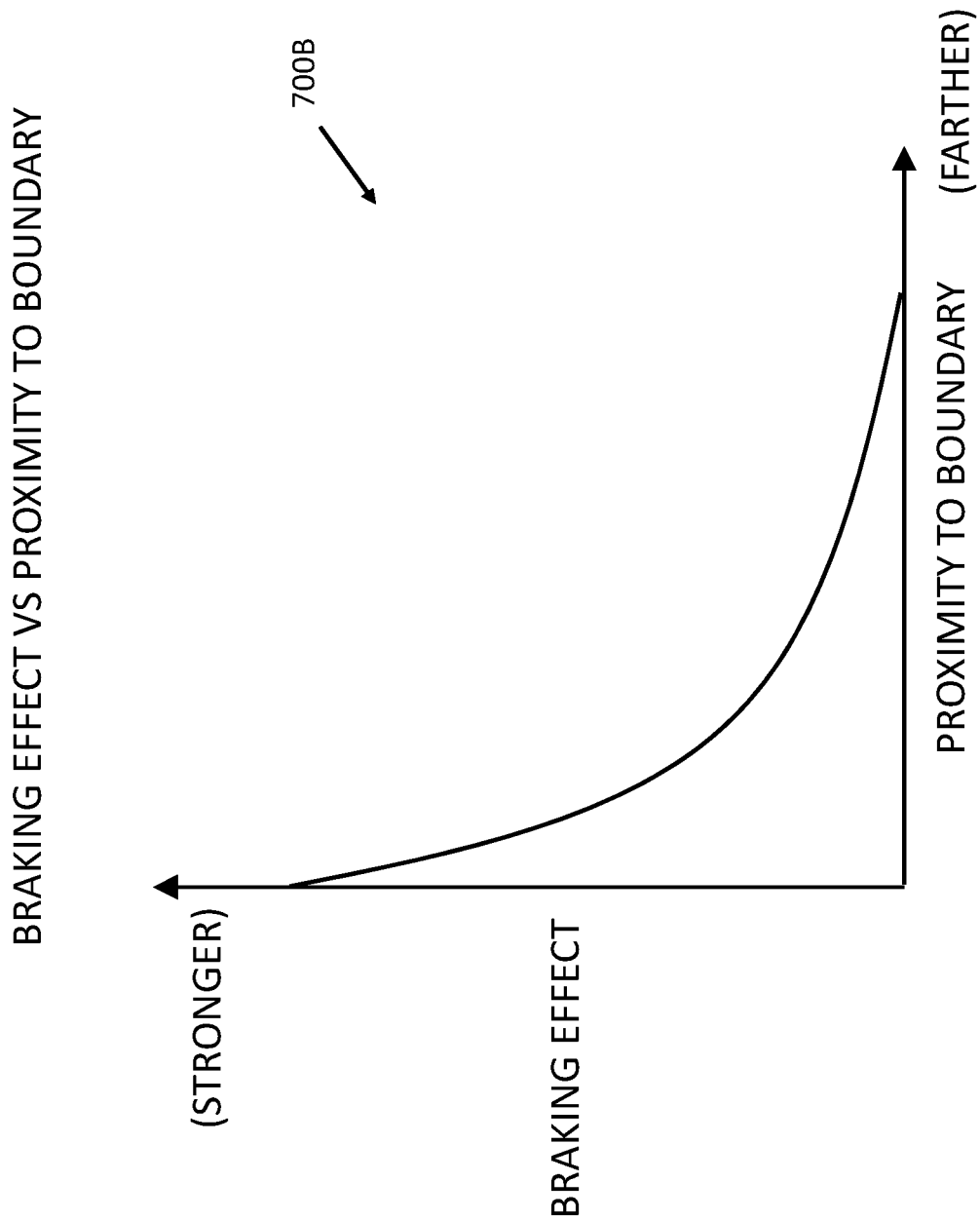
FIG. 7B depicts a graph view of an exemplary braking effect as an exponential function of a user's proximity to a boundary of a boundary-mapped surface.

FIG. 7B depicts a graph view of an exemplary braking effect as an exponential function 700B of a user's proximity to a boundary of a boundary-mapped surface. The exponential function 700B may be used by various controllers to generate a braking signal as a function of a proximity of a user to a safe operating area boundary.

FIG. 7C depicts a graph view of an exemplary braking effect as a piecewise linear function 700C of a user's proximity to a boundary of a boundary-mapped surface. The piecewise linear function 700C may be used by various controllers to generate a braking signal as a function of a proximity of a user to a safe operating area boundary.

Figure 7D:
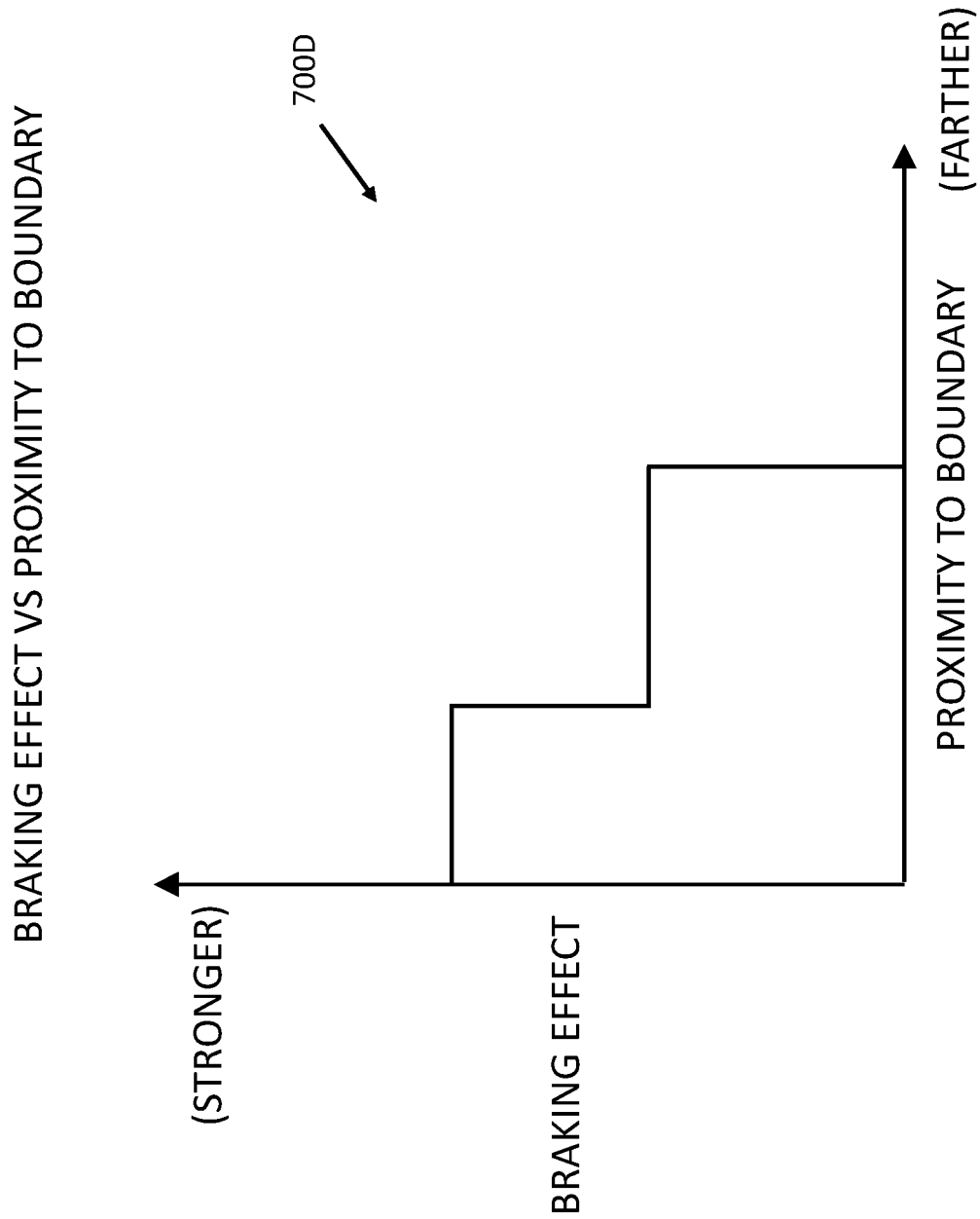
FIG. 7D depicts a graph view of an exemplary braking effect as a stepwise function of a user's proximity to a boundary of a boundary-mapped surface.

FIG. 7D depicts a graph view of an exemplary braking effect as a stepwise function 700D of a user's proximity to a boundary of a boundary-mapped surface. The stepwise function 700D may be used by various controllers to generate a braking signal as a function of a proximity of a user to a safe operating area boundary.

Although various embodiments have been described with reference to the figures, other embodiments are possible. For example, a safety lanyard module (SLM) may be mechanically coupled to a fixed anchor point on a surface to be boundary-mapped, the SLM may include two receivers in operable communication with a transmitter borne on a personal protection equipment (PPE) article worn by a user, the SLM may be configured in a learn-mode to store a set of associations of extracted lengths and angles as the user walks a boundary of the surface to be boundary-mapped. The SLM may be configured in a run-mode to apply a braking effect to a lanyard based upon the user's proximity to the boundary of the boundary-mapped surface, the proximity being determined based upon a difference of a current extracted length of the lanyard to a learned extracted length associated with a current angle of the lanyard. The extracted length at the angle may represent a boundary limit of a safe operating area.

In various examples, a brake may include a pawl mechanism. When positively engaged, the pawl mechanism may stop further extraction of a lanyard from a SLM spool. For example, various pawl mechanisms may place a SLM spool in a locked engagement with a SLM housing. Accordingly, various DLSRD controllers may generate a braking signal engaging a pawl mechanism as a function of a proximity of a user to a safe operating area boundary. In various examples, a pawl mechanism may be used alone or in combination with a variable braking mechanism.

In various embodiments, a DLSRS may operate without a lanyard. The DLSRS may include a wireless distance sensor, for example, laser-enable distance measurement. In deployments where crossing a protected area may be non-life-threatening, for example, an actor and/or a presenter in front of a tank of water, the transmitter may include haptic feedback. When the presenter, for example, speaks to an audience above on bleachers, his/her awareness of the edge of the water may be hindered. The transmitter may produce a haptic vibration in response to the presenter's nearness to the edge of the water.

In various examples, angles may be sensed by a 3D accelerometer. For example, various DLSRDs may tilt in response to a lanyard's angle. The 3D accelerometer may advantageously reduce the overall size of various DLSRD deployments, by removing the receivers. The 3D accelerometer may advantageously remove a transmitter, such as transmitter 220. In various implementations, the DLSRD may include an inclinometer.

A pre-fall detection system, such as a DLSRS, may include a self-retracting lifeline connected to an anchor, for protecting a worker from falling from a dangerous height, for example. The system may include an electronic control module, which may determine the location of a worker on a platform, for example. If the worker is in imminent danger of falling from the edge of the platform, then a braking mechanism may be activated to avoid the fall. The braking mechanism may start to pre-brake (e.g., partially engage), to provide increased level of drag, yet still allow the worker to benefit from the full extent of an DLSRD safety line while working near the platform edge. If the worker falls from the platform, then the rapid increase in the safety line being pulled out may be detected by the DLSRD and the braking mechanism may be fully engaged.

In various exemplary implementations, the controller may receive location distances from various detectors. In some examples, an altitude sensor may determine distance. For example, a worker on a ladder ascending in to a hazardous area may be distance monitored to determine a proximity to a ceiling fan, for example. In some examples, a worker may be descending into a hazardous area, such as an auger pit. The altitude sensor may detect the worker's proximity to the hazard. In some examples light detection and ranging (LIDAR) may determine distance. LIDAR may advantageously provide high resolution. Various exemplary rotational sensors may determine distance. For example, various safety lanyard devices (SRDs) may incorporate a rotational sensor on an integrated take-up reel. The rotational sensor may determine an extraction length of the lanyard to determine a user position, for example.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

In an exemplary aspect a safety lanyard system may include a transmitter configured to transmit a beacon signal from a location of a user. The safety lanyard system may include a first receiver and a second receiver disposed on opposite sides of a vertically oriented plane. Each of the first and second receivers may be operable to receive the beacon signal and to generate a first reception signal and a second reception signal, respectively. The safety lanyard system may include an extraction length detector, which may be configured to generate an extraction length signal indicative of an extracted length of a lanyard from a lanyard spool. The safety lanyard system may include a controller operably coupled to the first and second receivers to receive the first and second reception signals and coupled to the extraction length detector to receive an extraction length signal. The safety lanyard system may include a data store operably coupled to the controller.

The data store may include a program of instructions that, when executed by the controller, may cause the controller to perform operations to apply a pre-brake tension to the lanyard when a user approaches a safe operating area boundary. The operations may include determining an angle between the vertically oriented plane and the lanyard based on the comparison of the first reception signal and the second reception signal. The operations may include determining the extracted length of the lanyard based on the extraction length signal. The operations may include determining a proximity of the user to the safe operating area boundary. The operations may include generating a braking signal in response to the proximity determination.

The safety lanyard system may include a brake, which may be operably coupled to the controller to receive the braking signal and may be configured to retard the extraction of the lanyard from the lanyard spool in response to the braking signal. The safety lanyard system may include a housing that may contain the spool and the brake. The brake may be operably coupled to selectively engage the spool.

The operation to determine the proximity of the user to the safe operating area boundary may include receiving, from the data store, information representative of one or more stored extracted lengths associated with angles previously determined by positioning the transmitter at two or more of locations along the boundary of the surface. The received information may include a stored extraction length associated with a current angle between the vertically oriented plane and the lanyard. The operation to determine the proximity of the user to the safe operating area boundary may include determining a difference between the determined extracted length and the stored extraction length associated with the current angle.

In various exemplary implementations, the extraction length detector may include an optical encoder. In some examples, the extraction length detector may include a magnetically coupled encoder. The system may include an audible output device operably coupled to the controller, and the operations may include generating an audible notification signal for transmission to the audible output device in response to the proximity determination. The system may include a haptic output device operably coupled to the controller, and the operations may include generating a haptic notification signal for transmission to the haptic output device in response to the proximity determination. The system may include a visual output device operably coupled to the controller, and the operations may include generating a visual notification signal for transmission to the visual output device in response to the proximity determination. The housing may be configured to couple in a translatable engagement along a horizontally extending guide wire.

In an exemplary aspect, a safety lanyard system may include a brake generation module for generating a braking signal as a function of a proximity of the user to a safe operating area boundary. The safety lanyard system may include a brake, which may be operably coupled to the brake generation module to receive the braking signal and may be configured to retard the extraction of the lanyard from the lanyard spool in response to the braking signal. The brake generation module may be further for receiving information representative of one or more stored extracted lengths associated with angles previously determined by positioning the transmitter at two or more locations along the boundary of the surface.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A safety lanyard system comprising:
a transmitter configured to transmit a beacon signal from a location of a user;
a first receiver and a second receiver disposed on opposite sides of a vertically oriented plane, each of the first and second receivers operable to receive the beacon signal and to generate a first reception signal and a second reception signal, respectively;
an extraction length detector configured to generate an extraction length signal indicative of an extracted length of a lanyard from a lanyard spool;
a controller operably coupled to the first and second receivers to receive the first and second reception signals, and coupled to the extraction length detector to receive an extraction length signal;
a data store operably coupled to the controller, wherein the data store comprises a program of instructions that, when executed by the controller, cause the controller to perform operations to apply a pre-brake tension to the lanyard when a user approaches a safe operating area boundary, the operations comprising:
determine an angle between the vertically oriented plane and the lanyard based on the comparison of the first reception signal and the second reception signal;
determine the extracted length of the lanyard based on the extraction length signal;
determine a proximity of the user to the safe operating area boundary; and,
generate a braking signal in response to the proximity determination; and,
a brake operably coupled to the controller to receive the braking signal and configured to retard the extraction of the lanyard from the lanyard spool in response to the braking signal; and,
a housing that contains the lanyard spool and the brake, wherein the brake is operably coupled to selectively engage the lanyard spool.

2. The safety lanyard system of claim 1, wherein the operation to determine the proximity of the user to the safe operating area boundary further comprises:
receive, from the data store, information representative of one or more stored extracted lengths associated with angles previously determined by positioning the transmitter at a plurality of locations along the boundary of the surface.

3. The safety lanyard system of claim 2, wherein the received information comprises a stored extraction length associated with a current angle between the vertically oriented plane and the lanyard.

4. The safety lanyard system of claim 3, wherein the operation to determine the proximity of the user to the safe operating area boundary further comprises:
determine a difference between the determined extracted length and the stored extraction length associated with the current angle.

5. The safety lanyard system of claim 1, wherein the extraction length detector comprises an optical encoder.

6. The safety lanyard system of claim 1, wherein the extraction length detector comprises a magnetically coupled encoder.

7. The safety lanyard of system of claim 1, further comprising an audible output device operably coupled to the controller, and the operations further comprise:
generate an audible notification signal for transmission to the audible output device in response to the proximity determination.

8. The safety lanyard system of claim 1, further comprising a haptic output device operably coupled to the controller, and the operations further comprise:
generate a haptic notification signal for transmission to the haptic output device in response to the proximity determination.

9. The safety lanyard system of claim 1, further comprising a visual output device operably coupled to the controller, and the operations further comprise:
generate a visual notification signal for transmission to the visual output device in response to the proximity determination.

10. The safety lanyard system of claim 1, wherein the housing is further configured to couple in a translatable engagement along a horizontally extending guide wire.

11. A safety lanyard system comprising:
a transmitter configured to transmit a beacon signal from a location of a user;
a first receiver and a second receiver disposed on opposite sides of a vertically oriented plane, each of the first and second receivers operable to receive the beacon signal and to generate a first reception signal and a second reception signal, respectively;
an extraction length detector configured to generate an extraction length signal indicative of an extracted length of a lanyard from a lanyard spool;
a controller operably coupled to the first and second receivers to receive the first and second reception signals, and coupled to the extraction length detector to receive an extraction length signal;
a data store operably coupled to the controller, wherein the data store comprises a program of instructions that, when executed by the controller, cause the controller to perform operations to apply a pre-brake tension to the lanyard when a user approaches a safe operating area boundary, the operations comprising:
determine an angle between the vertically oriented plane and the lanyard based on the comparison of the first reception signal and the second reception signal;
determine the extracted length of the lanyard based on the extraction length signal;
determine a proximity of the user to the safe operating area boundary; and,
generate a braking signal in response to the proximity determination; and,
a brake operably coupled to the controller to receive the braking signal and configured to retard the extraction of the lanyard from the lanyard spool in response to the braking signal.

12. The safety lanyard system of claim 11, wherein the operation to determine the proximity of the user to the safe operating area boundary further comprises:

receive, from the data store, information representative of one or more stored extracted lengths associated with angles previously determined by positioning the transmitter at a plurality of locations along the boundary of the surface.

13. The safety lanyard system of claim 12, wherein the received information comprises a stored extraction length associated with a current angle between the vertically oriented plane and the lanyard.

14. The safety lanyard system of claim 13, wherein the operation to determine the proximity of the user to the safe operating area boundary further comprises:
    determine a difference between the determined extracted length and the stored extraction length associated with the current angle.

15. The safety lanyard system of claim 11, wherein the extraction length detector comprises an optical encoder.

16. The safety lanyard system of claim 11, wherein the extraction length detector comprises a magnetically coupled encoder.

17. The safety lanyard system of claim 11, further comprising an audible output device operably coupled to the controller, and the operations further comprise:
    generate an audible notification signal for transmission to the audible output device in response to the proximity determination.

18. The safety lanyard system of claim 11, further comprising a haptic output device operably coupled to the controller, and the operations further comprise:
    generate a haptic notification signal for transmission to the haptic output device in response to the proximity determination.

* * * * *